(12) United States Patent
Lindwer

(10) Patent No.: US 6,298,434 B1
(45) Date of Patent: *Oct. 2, 2001

(54) DATA PROCESSING DEVICE FOR PROCESSING VIRTUAL MACHINE INSTRUCTIONS

(75) Inventor: Menno M. Lindwer, Eindhoven (NL)

(73) Assignee: U.S. Philips Corporation, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/164,692

(22) Filed: Oct. 1, 1998

(30) Foreign Application Priority Data

Oct. 2, 1997 (EP) .................................................. 97203033
Mar. 27, 1998 (EP) .................................................. 98200967

(51) Int. Cl.[7] ............................................................ G06F 9/38
(52) U.S. Cl. .......................... 712/209; 712/205; 712/208; 709/1
(58) Field of Search .................................. 712/205, 211, 712/221, 234, 209, 208; 709/1, 100, 108, 220, 221, 212

(56) References Cited

U.S. PATENT DOCUMENTS

| | | | |
|---|---|---|---|
| 3,735,363 | * 5/1973 | Beers et al. | 712/205 |
| 4,443,865 | 4/1984 | Schultz et al. | 364/900 |
| 4,633,390 | * 12/1986 | Yoshida | 712/211 |
| 4,754,393 | * 6/1988 | Kitson et al. | 712/234 |
| 4,785,393 | * 11/1988 | Chu et al. | 712/221 |
| 6,009,261 | * 12/1999 | Scalzi et al. | 703/26 |

FOREIGN PATENT DOCUMENTS

| | | | |
|---|---|---|---|
| WO9723823 | 7/1997 | (WO) | G06F/9/00 |
| WO9727537 | 7/1997 | (WO) | G06F/9/318 |

OTHER PUBLICATIONS

Eddy H. DeBaere et al, "Interpretation and Instruction Path Coprocessing", The MIT Press 1990, pp. 112–117. 129–146, 163–165.

* cited by examiner

*Primary Examiner*—Meng-Al T. An
*Assistant Examiner*—Wen-Tai Lin

(57) ABSTRACT

A preprocessor is functionally inserted between a memory and a processor core. The preprocessor fetches virtual machine instructions, like Java instructions, from the memory and from them it generates native instructions which are supplied to the processor core. In response to a special virtual instruction the preprocessor supplies a native jump to subroutine to the processor core, monitors when the processor core returns from that subroutine and then resumes supplying generated native instructions. The invention also provides for a processor which has a special instruction which calls a subroutine and causes the processor to convert a call context for virtual machine instructions to a call context for a high level language subroutine before making the call.

7 Claims, 4 Drawing Sheets

DATA PROCESSING DEVICE FOR PROCESSING VIRTUAL MACHINE INSTRUCTIONS

RELATED CASE

The present application is a continuation-in-part of the US counterpart of unpublished European patent application no. 97203033.2 (PHN 16542), by the same inventor and assigned to the same assignee, U.S. Ser. No. 09/161,848 filed Sep. 28, 1998. This parent patent application is incorporated herein by way of reference.

Unpublished European patent application No. 97203033.2 improves the speed with which programs expressed in the virtual machine instruction set are processed. This is achieved by adding a preprocessor between the memory and the processor core. The preprocessor stores for each particular virtual machine instruction one or more native instructions that express the function of that particular machine instruction. The preprocessor reads a virtual machine instruction from memory, selects the native instruction or instructions defined for that virtual machine instruction and supplies this instruction or these instructions to the processor core for execution. The processor core executes the native instructions that perform the function defined by the virtual machine instruction consecutively: between the clock cycles for those native instructions no processor core clock cycles are used in which the processor core executes additional instructions to select the appropriate native instructions.

In addition, the processing device of European patent application No. 97203033.2 is also capable of executing native instructions from the memory without translation by the preprocessor. This is done on the basis of the instruction address issued by the processor core: the preprocessor will supply translated native instructions only when the instruction address issued by the processor core is in a predefined address range; otherwise the memory content of the addressed location is supplied to the processor core.

BACKGROUND OF THE INVENTION

1. Field of the Invention

The invention relates to the field of data processing devices using virtual machine instructions.

2. Related Art

A processor core normally is capable of executing instructions from a native instruction set only. For various reasons it is desirable that such a processor core is able to process programs expressed in an other instruction set than this native instruction set. In this way a standard processor core may be used without hardware modifications for example to emulate processing by a different processor core, e.g. a core for executing Java instructions. Such another instruction set in which a program is expressed, but which is not the native instruction set whose instructions the processor core is capable of executing, will be called a virtual machine instruction set.

Conventionally, processing of instructions from the virtual machine instruction set is realized by means of an interpreter program which is executed by the processor core. This is exemplified by U.S. Pat. No. 4,443,865. For each virtual machine instruction the interpreter program contains a corresponding execution program expressed in native instructions. The interpreter causes the processor core to read a virtual machine instruction from memory, to select the address of the execution program for the virtual machine instruction and to transfer control of the processor core to that execution program. Such processing by means of an interpreter is intrinsically slower than direct execution, because the processor core needs to spend processing cycles on the selection of addresses of execution programs and transfer of control in addition to the processing cycles needed to perform the functional tasks of the execution program.

It has been found that translation of virtual machine instructions by a preprocessor, although generally satisfactory, reduces the flexibility of the definition of the meaning of virtual machine instructions and that a few of the virtual machine instructions require excessive memory in the preprocessor.

SUMMARY OF THE INVENTION

It is an object of the invention to make the data processing device with a preprocessor between the memory and the processor core more flexible.

The data processing device according to the invention is characterized by the preprocessor being arranged for
- reading a further virtual machine instruction of a special type from the memory,
- retrieving a target address which has been predefined for a further special type and
- causing the processor core to execute a subroutine of the native instructions located in the memory at a location indicated by the target address in response to the further virtual machine instruction.

Thus in response to a selected virtual machine instruction (the further virtual machine instruction) the preprocessor causes the processor core to execute a native subroutine from memory instead of normally supplying locally stored native instructions to the processor core. In this way the preprocessor provides for virtual machine program execution by a mix of consecutive execution of translated instructions and native subroutine execution. Processing virtual instructions by subroutine calls is comparable to the way conventional interpreters process virtual instructions, except that the preprocessor instead of the processor core generates the native subroutine call instruction from the further virtual instruction. In this way a minimum of processing cycles of the processor core is lost.

Upon return from the native subroutine the preprocessor resumes supplying translated native instructions to the processor core. To detect the return the preprocessor may for example monitor the instruction addresses issued by the processor core.

In an embodiment of the processing device according to the invention the preprocessor makes it possible to call a subroutine compiled from a high level language. Virtual machine instructions expect to find their arguments in storage locations as defined by a first argument storage convention. High level language compilers often assume the existence of a "context" when calling a subroutine. This context usually involves arguments for the subroutine that are stored at specific, predefined storage locations, such as a number of predefined registers and/or memory locations pointed at by a stack pointer register. The definition of these storage locations is fixed by a second argument storage convention, which defines the storage locations in a uniform way for all subroutines in the high level language.

Generally this second storage convention will differ from the first argument storage convention used by the high level language, for example because no specific registers are defined as locations for arguments.

To make use of subroutines compiled from such high level languages the invention provides for a data processing device wherein the preprocessor monitors whether instruction addresses issued by the processor core are inside a predetermined range, an instruction address range of the subroutine lying outside the predetermined range, the preprocessor detects completion of the subroutine when the processor core from issues an instruction address inside the predetermined range after transfer of control to the subroutine.

When the preprocessor issues native instructions to the processor core that cause it to transfer control to such a subroutine that the preprocessor fist causes the processor core to transfer the arguments from the storage locations defined by the first storage convention (used for the arguments of virtual machine instructions) to the storage locations defined by the second argument storage convention before actually transferring control to the subroutine.

More generally the invention also relates to a data processing device including a processor. The processor has an instruction set containing first instructions. Each first instruction causes the processor to execute a respective operation before executing a directly succeeding instruction from the instruction set. The respective operations each use one or more arguments. The arguments are stored at storage locations predefined by a first argument storing convention. The instruction set also contains a special instruction which causes the processor to jump to a subroutine. The subroutine uses one or more arguments stored at storage locations predefined by a second argument storing convention. The processor transfers the one or more arguments to the storage locations predefined by the second argument storing convention from storage locations predefined by the first argument storing collection in response to the special instruction. In this device the processor is capable of executing instructions such as virtual machine instructions which use arguments stored according to one argument storage convention. When a special instruction is encountered, the processor responds by transferring the arguments to storage locations predefined by another storage convention before calling a subroutine.

BRIEF DESCRIPTION OF THE DRAWING

These and other advantageous aspects of the invention will be illustrated by way of non-limitative example using the following description and figures. In the figures

DETAILED DESCRIPTION OF THE PREFERRED EMBODIMENTS

Figure 1A:
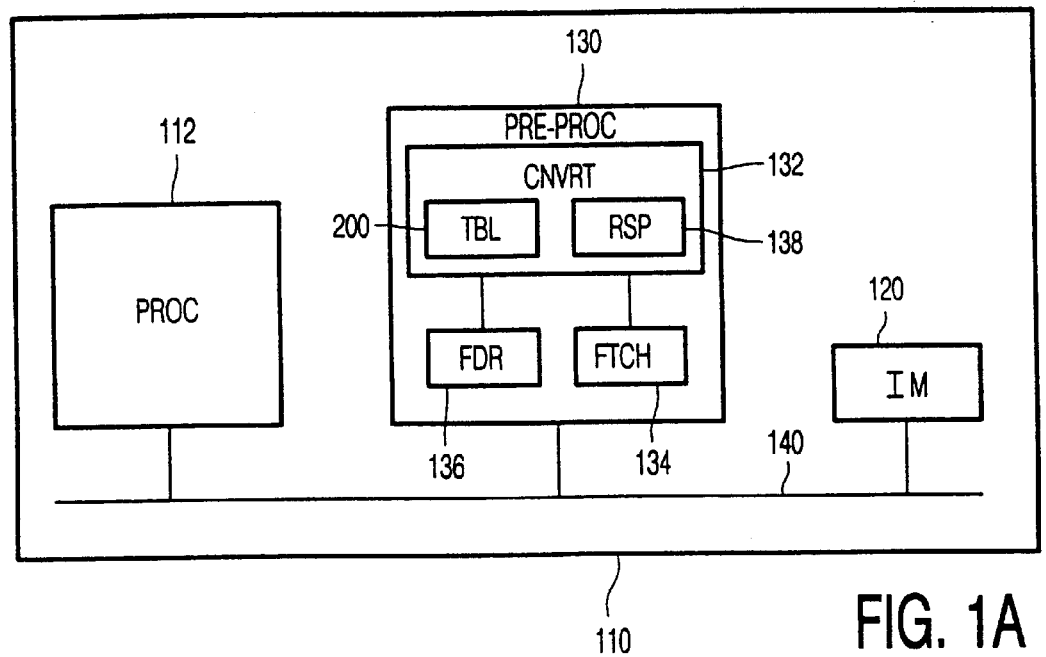
FIGS. 1A–D illustrate four possible architectural options of locating the pre-processor in the processing device.

FIGS. 1A–D illustrate four possible architectural options of locating the preprocessor in a processing device. Three main components of the processing device are an instruction memory 120, a processor core 112 and a preprocessor 130. The preprocessor 130 is a functional cascade of a fetch unit 134, a converter 132 and a feed unit 136.

In FIG. 1A the main components of the processing device are interconnected via a general peripheral interconnect bus 140, such as the PI bus. The pre-processor 130 is a peripheral on the bus. The pre-processor 130 may act as a memory-mapped peripheral, where a predetermined range of addresses is allocated to the preprocessor. In response to the processor core 112 issuing on the bus 140 a request for an instruction with an address in this range, the pre-processor 130 issues the native instruction on the bus 140. When required, the pre-processor 130 fetches a virtual machine instruction from the instruction memory 120 via the bus 140.

Figure 1B:
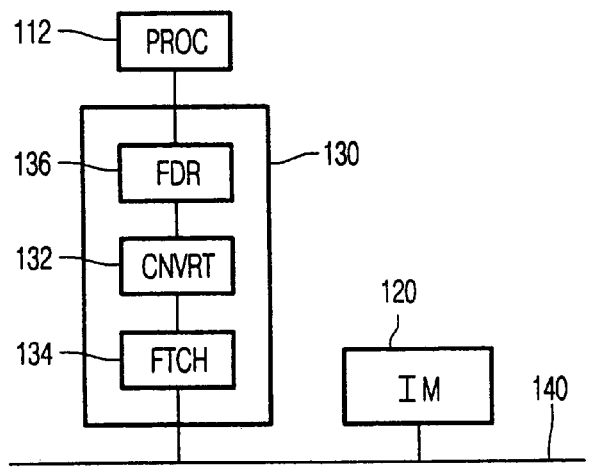
Figure 1C:
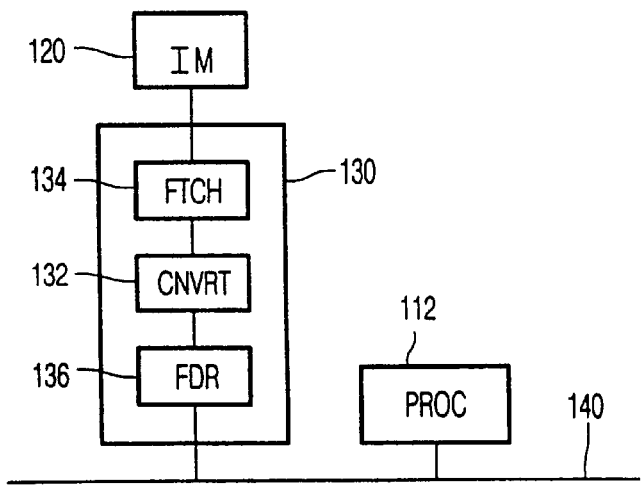

In FIGS. 1B and lC, the pre-processor 130 is located electrically in between the processor core 112 and the instruction memory 120. In this case the pre-processor 130 needs to distinguish between native and virtual machine instructions coming from the instruction memory 120. Therefore, these configurations may delay execution of native instructions stored in the instruction memory 120. For reasons of clarity not all elements shown in FIG. 1A are repeated in FIGS. 1B, 1C and 1D.

Figure 1D:
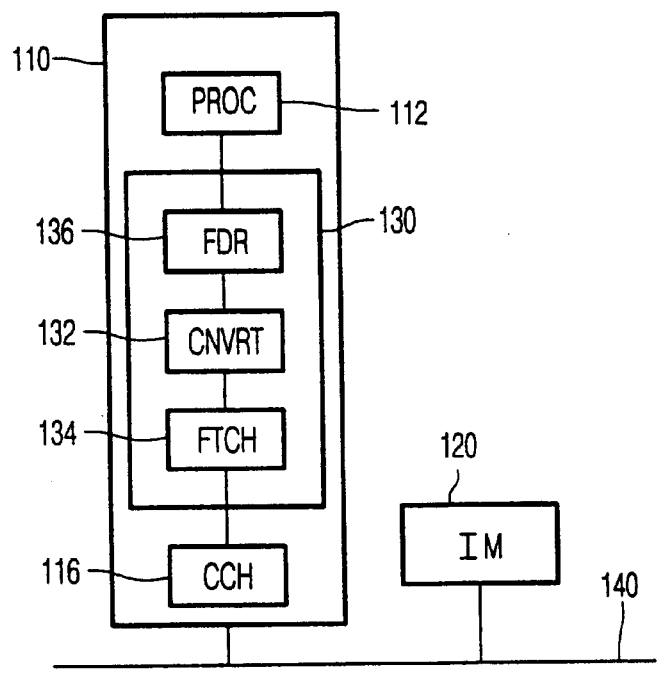

In FIG. 1D, the pre-processor 130 is embedded in a processor 110. The preprocessor 130 is preferably located between an instruction cache 116 of the processor 110 and the processor core 114. This configuration allows for optimal performance but, unlike the configurations of FIGS. 1A, 1B and 1C, requires internal changes to the processor 110.

The processor core is arranged for executing native instructions from a predetermined set of so-called "native" (core specific) instructions. This means that it contains everything needed for executing programs of native instructions when it is connected to a memory: for example it will have an instruction and data port, contains registers for storing operands, an instruction pointer register (program counter), functional elements for processing the operands or adjusting the program counter (e.g. jumps), data paths connecting data port, the registers and the functional elements, and instruction decoding circuits for controlling the processing of native instructions and so on. An example suitable for executing embedded software is a RISC-type core, as used in the MIPS PR3001 range of microprocessors.

In operation, the instruction memory 120 stores virtual machine instructions, such as instructions for a stack machine. An example of such virtual instructions are Java bytecodes. The native instructions of the processor core are different from the virtual machine instructions of the virtual machine. The processor core 112 by itself is not able to directly execute virtual machine instructions stored in the instruction memory 120. In response to the processor core 112 requesting an instruction, the pre-processor 130 issues the native instruction. In order to be able to generate the native instruction the pre-processor 130 maintains a virtual machine instruction counter (this counter is located for example in a register (not shown) in the preprocessor or in the processor core, in which case it is updated and/or read by instructions passed from the preprocessor 130 to the core 112). The preprocessor 130 fetches a virtual machine instruction from the instruction memory 120 at an address designated by the virtual machine instruction counter using fetch unit 134.

The pre-processor 130 comprises a converter 132 for converting a virtual machine instruction, fetched from the instruction memory 120, into at least one native instruction. In general, a virtual machine instruction is converted to a sequence of native instructions. The pre-processor 130 further comprises a feed unit 136 for feeding native instructions of the sequence to the processor core 112 for execution. When executing a virtual machine program the processor core 112 in fact executes a native program generated by the pre-processor 130. Where normally the instruction pointer of the processor core 112 indicates which next instruction in the instruction memory 120 required by the processor core 112 to be executed next, now the instruction pointer indicates to the pre-processor 130 only that a next native instruction is required (or a re-feeding of a previous instruction). The processor core 112 has no (explicit) knowledge of the virtual machine instruction or of the virtual machine instruction pointer.

It will be appreciated that the instruction memory 120 may also contain native instructions. Such native instructions may for instance be used to initialize the system or to allow certain software modules, such as drivers or special parts of the embedded software application, to be compiled to native instructions for optimal performance.

The preprocessor 130 makes a decision whether to supply converted native instructions derived from a virtual machine instruction or to let the processor core 112 execute instructions from memory as native instructions. The preprocessor 130 may implement this decision in various ways. For example, the pre-processor 130 may monitor the instruction addresses issued by the processor core 112. If an issued instruction address is in a predetermined range the preprocessor 130 will supply converted instructions to the processor core 112. If the issued instruction address is outside that predetermined range, the content of the location in memory 120 that is addressed by the issued instruction address is passed to the processor core as a native instruction. To keep the program counter inside the predetermined range during processing of virtual machine instructions, the pre-processor 120 may supply a jump instruction back to the start of the predetermined range each time the program counter of the processor core 112 approaches the end of the predetermined range.

As an alternative mechanism for the decision to supply converted instructions the preprocessor 130 may use a special register which indicates the current type of instruction (virtual machine/native). In this case an instruction for changing the content of the register needs to be executed each time a change of type occurs.

When the processor core 112 is part of a processor which also contains an instruction cache, it may be desirable to utilize this instruction cache between the pre-processor 130 and the actual processor core 112. In this way, the design of the processor which incorporates both the instruction cache and the processor core 112 does not need to be changed to cooperate with the preprocessor 130. In this case the pre-processor 130 preferably each time supplies a cache line with more than one converted instructions at a time to the cache when the a new cache line is requested. The pre-processor may use a conventional pipe-lining mechanism to convert instructions ahead of actual execution and to place successive converted instructions in readiness in a register for prefetching by the cache.

Also, in case an instruction cache is present between the pre-processor and the processor core 112, the pre-processor 130 may need to ensure that the processor core 112 does not fetch "old" converted instructions from the instruction cache instead of receiving them from the pre-processor 130. This may be ensured in the following way in case virtual machine instructions are supplied when the instruction pointer address is within the predetermined range and the pre-processor 130 issues jump instructions to the processor core 122 to keep the instruction pointer in the predetermined range. If the predetermined range of instruction addresses which is used to decide on execution of converted instructions is sufficiently large, i.e. at least as large as the cache size instructions in the instruction cache are overwritten before the instruction pointer of the processor core returns to the same address.

The converter 132 is used for converting a virtual machine instruction, fetched from the instruction memory 120, into at least one native instruction. As an example, the Java byte code (a virtual machine instruction) for integer addition (0×60) results in adding the two top elements of the stack, removing the two top elements from the stack and pushing the sum on the stack. This virtual machine instruction may be converted to the following sequence of instructions (native instructions) for a MIPS processor (a 32-bits machine), where $tsop is a register pointing to the first empty location of the stack (above the top of stack):

| | |
|---|---|
| lw $a0, 4 ($tosp) | // load the top element of the stack in register $a0 |
| lw $a1, 8 ($tosp) | // load the second element of the stack in $a1 |
| add $a0, $a1, $a0 | // add $a0 and $a1, place the sum in $a0 |
| addi $tosp, $tosp, 4 | // lower the stack by one element |
| sw $a0, 4 ($tosp) | // store the sum in the new top of stack |

Preferably, the converter 132 comprises a table for converting a virtual machine instruction to a sequence of native instructions. A one dimensional table may be used, where each cell of the table comprises a sequence of native instructions for one corresponding virtual machine instruction. The cell number may correspond to the value of the corresponding virtual machine instruction. As an example, the sequence of native instructions for the Java integer addition (0×60) may be located in cell 96 (=0×60 in hexadecimal notation). Since the length of the sequence of native instructions may vary considerably for the various virtual instructions, preferably the sequences are located in a table where the sequences immediately follow each other, that is without any explicit cell structure.

Figure 2:
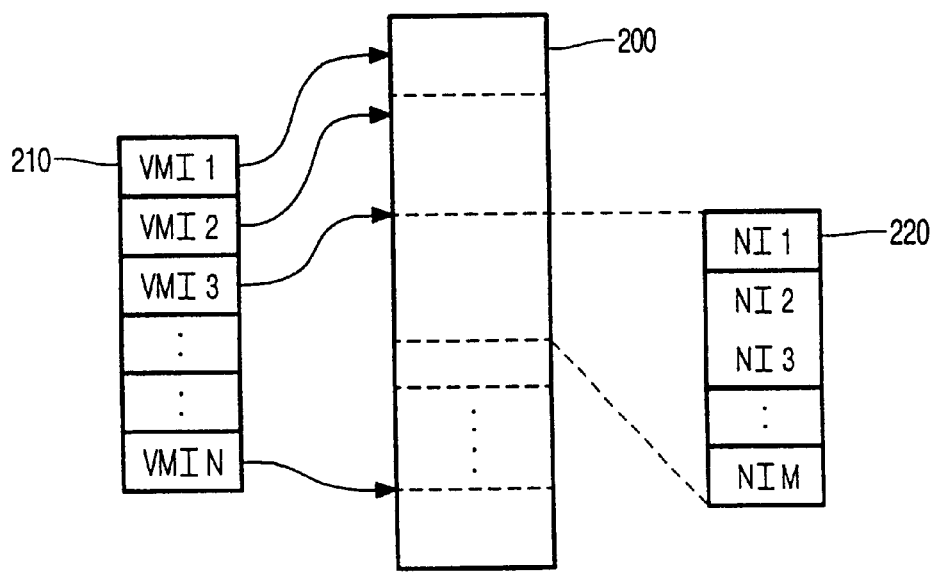
FIG. 2 shows a translation table for translating a virtual machine instruction into a sequence of native instructions.

FIG. 2 shows a translation table 200 for use in is shown in FIG. 2, where the implicit cell boundaries are indicated using dotted lines. In order to be able to locate a sequence for a virtual machine instruction a code index table 210 may be used, which for each virtual machine instruction (VMI 1 to VMI N) indicates the starting point of the corresponding sequence in the translation table 200. For the cell of the translation table 200 which corresponds to VMI 3 the related sequence 220 of native instruction NI 1 to NI M are shown.

When the converter 132 receives a virtual machine instruction I, the converter uses the virtual machine instruction I as an index for accessing code index table 210, in order to retrieve the starting point of the sequence of native instructions that should be executed each time an instruction of the same type as I is processed. Subsequently, the converter 132 accesses the translation table 200 at a first address indicated by the code index retrieved from code index table 210 in order to read a first native instruction. This first native instruction is supplied to the processor core 112 via the feed unit 136. Subsequently, the converter accesses the translation table 200 at addresses following the first address to read further native instructions used to execute the virtual machine instruction I. When all these instructions have been read, which is indicated for example by a termination entry in the translation table 200, the process is repeated for a subsequent virtual machine instruction.

A further example of a conversion is given for the Java byte code bipush n (used for sign extending byte n and placing the result on top of the stack). This virtual machine instruction consists of two bytes {0×16 and n), where the first byte specifies the operation and the second byte provides the parameter n. The instruction may be converted to the following sequence of native MIPS instructions:

```
ori $a0, $0, n      /* Load register $a0 with constant n */
sll $a0, $a0, 24    /* Shift left by 24 bits */
sra $a0, $a0, 24    /* Arithmetic shift right, causing sign extension,
                       by replicating last left-most bit */
sw $a0, 0 ($tosp)   /* Store result at new top of stack */
addi $tosp, -4      /* Increment stack size */
```

This example illustrates that a virtual machine instruction may be parametrized, where an operation code is followed by at least one operand. Advantageously, the converter 132 comprises a translation table 200, where native instructions are represented either by the full code or by an instruction skeleton. As an example, the instruction addi $tosp, -4 (last instruction of the sequence of the previous example) contains no variable parts and may be located in full as a 4-byte entry in the table. The instruction ori $a0, $0, n (first instruction of the sequence of the previous example) contains a variable part and may be located in the table as a skeleton, not specifying the variable part (being n). Preferably, the entry in the table for an instruction skeleton is the same width as a full instruction (e.g. 4-bytes for a MIPS processor), allowing a uniform table. Further information may be located in the table (or in separate table(s)) for indicating how the unspecified part of the native instruction skeleton should be filled in. Advantageously, microprogramming is used to fill in the unspecified parts. The further information may then comprise or indicate micro code. It will be appreciated that it is advantageous to use for an instruction skeleton a same structure (width and composition) as for a full native instruction. However, other structures may be used as well.

If the virtual machine is a stack oriented machine, preferably the stack or at least the top elements of the stack are mapped onto registers of the processor core 112. In this way the memory stack (with the virtual machine stack) is mapped to the register stack (using for example memory locations with increasing addresses for increasingly higher positions on the stack or memory locations with decreasing addresses for increasingly higher positions on the stack, and independently register locations with increasing addresses for increasingly higher positions on the stack or register locations with decreasing addresses for increasingly higher positions on the stack).

Assuming that registers $r1, $r2 and $r3 contain three successive elements of the memory stack, where initially $r1 corresponds to the first empty location of the memory stack, $r2 contains the top of the memory stack, and $r3 contains the second element of the memory stack, the Java byte code bipush n may be converted to the following sequence of native MIPS instructions:

ori $r1, $0, n sll $r1, $r1, 24 sra $r1, $r1, 24 similarly if $r2 is the top of stack a Java byte code instruction add may be converted into add $r3, $r2, $r3

In this case, the preprocessor 130 also keeps a pointer indicative of the register (e.g. $r2) that stores the top of stack. When a virtual machine instruction is translated, the preprocessor generates native instructions in which the references to register are adapted according to the content of this pointer to the top of stack. The pointer is updated according to virtual the instruction. E.g. after the bipush instruction one item has been added to the stack and if the bipush instruction of the example is followed by a next bipush instruction, the top of stack might be $r1, so that in the translation of this next bipush instruction $r0 is used instead of $r1 in the native instructions (ori $r0, $0, n'/s11 $r0, $r0, 24/sra $r0, $r0, 24). Similarly after Java byte code instruction iadd the stack contains one item less, so that if the iadd instruction of the example is followed by a bipush instruction, the top of stack might be $r3, so that in the translation of this next bipush instruction $r2 is used instead of $r1 in the native instructions (ori $r2, $0, n'/s11 $r2, $r2, 24/sra $r2, $r2, 24).

Logically, the pre-processor 130 manages an independent virtual machine instruction pointer indicating the current (or next) virtual machine instruction in the instruction memory 120. The processor core 112 has its own instruction pointer (program counter) and issues instruction addresses based upon that program counter. When the pre-processor 130 is active these instruction addresses are not normally used to select which individual virtual machine instructions are to be executed. In this case the program counter of the processor core is partly redundant. The program counter of the processor core 112 and its instruction fetch mechanism are present in the processor core 112 anyway because the processor core 112 is a standard core, designed for executing native programs on its own, the preprocessor being added as an option.

During normal processing of virtual machine instructions, the value of the instruction addresses issued by the processor core 112 are irrelevant for selecting individual instructions. Instead, the preprocessor 130 uses its own viral machine instruction pointer to determine which virtual machine instruction should be loaded and supplies to the processor core 112 the native machine instructions that are stored for that virtual machine instruction in the preprocessor 130. These stored native machine instructions normally do not include jump, branch etc. instructions that cause a change in the value of the program counter of the processor core.

However, according to the invention, the preprocessor 130 responds to some special virtual machine instructions by supplying a "jump to subroutine" instruction (or its equivalent) to the processor core 112. The jump target address of this instruction points at a location in instruction memory 120 which contains the start of a subroutine in native instructions. In response to this jump to subroutine instruction, the processor core 112 starts issuing instruction addresses from the jump target address, receiving the native instructions that make up the subroutine from memory 120 and executing these instructions without intervention of the preprocessor 130. During execution of the subroutine the preprocessor 130 suspends the issuing of converted instructions: it merely monitors the operation of the processor core 112 to determine whether a return from subroutine corresponding to the original jump to subroutine occurs. If the preprocessor 130 detects such a return from subroutine, the preprocessor 130 resumes issuing native instructions dependent on the virtual machine instructions.

Figure 3:
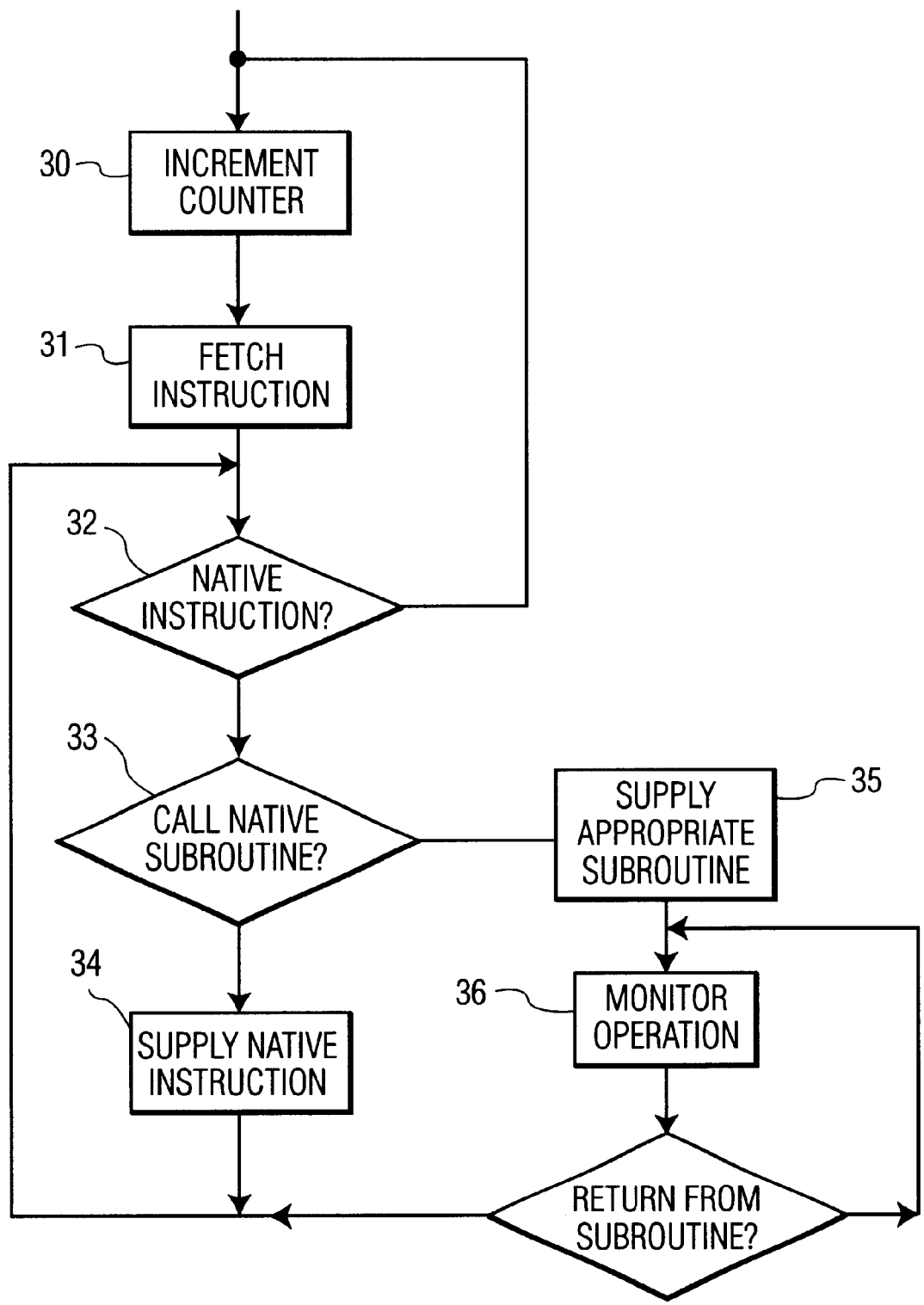
FIG. 3 shows a flow-chart of an embodiment of operation of a pre-processor.

FIG. 3 shows a flow-chart of an embodiment of operation of the pre-processor 130. The flow-chart shows a loop of sequential steps for reasons of clarity; in practice the steps may be pipelined: steps from one or more iterations of the loop may be executed concurrently. In a first step 30 of the flow-chart, the pre-processor 130 increments its virtual machine program counter. In a second step 31 of the flow-chart, the pre-processor 130 fetches the virtual machine instruction pointed at by the virtual machine program counter. In a third step 32, the preprocessor 130 tests whether there are any native instructions for that virtual machine instruction. If not, the flow-chart continues from the first step 310, if so the preprocessor 130 continues with a fourth step 33. In the fourth step 33, the preprocessor 130 tests whether a native subroutine should be called or not. If not, the preprocessor 130 executes a fifth step 34, in which it supplies a native instruction to the processor core 112 and continues with the third step 32 to see if there are any further native instructions for the virtual machine instruction left.

If in the fourth step 33 the preprocessor 130 decides that a native subroutine should be called, the preprocessor 130 proceeds to a sixth step 35 in which it supplies an appropriate subroutine call instruction to the processor core 112. After that the preprocessor 130 monitors operation of the processor core in a seventh step 36 and decides in an eighth step 37 whether the processor core 112 has returned from the subroutine. The pre-processor 130 keeps monitoring operation of the processor core 112 until the processor core 112 returns from the subroutine. Thereupon the pre-processor returns to the third step 32.

An advantageous way of monitoring the operation of the processor core 112 is to observe the instruction addresses issued by the processor core 112. In this cases the pre-processor 130 uses the instruction address issued by the processor core 112 to detect whether it should supply converted instructions to the processor core 112 or allow the processor core 112 to execute native instructions. E.g. a converted instructions is supplied only if the issued address is in a predetermined range. In this case, the instruction address issued by the processor core 112 will be in this predetermined range when the jump to subroutine instruction is issued. The jump target address will be outside the predetermined range, causing execution of native instructions from memory 120, and upon return from subroutine the instruction address issued by the processor core 112 will return to the predetermined range, causing the pre-processor 130 to resume the supplying of converted instructions.

Of course, the switch between supplying converted instructions, executing the native instructions of the subroutine and back can be implemented in various other ways. For example, one might use a jump instead of a jump to subroutine to start the subroutine and execute a jump back anywhere into the predetermined range at the end of the subroutine. This will also enable the pre-processor to detect that execution of the subroutine has been completed.

Preferably, the preprocessor uses a RAM memory for storing one or more addresses of the subroutines. In this case, the table of native instructions which is used to convert virtual machine instructions into native instructions may contain, for selected instructions, an entry indicating that the pre-processor 130 should supply a native jump-to-subroutine instruction to the processor core 112 and a pointer to the location in RAM where the target address of that jump to subroutine instruction is stored. Upon encountering such an entry, the preprocessor 130 will supply the jump to subroutine instruction to the processor core 112, for example with the target address substituted into this instruction or using a jump to subroutine indirect instruction using a pointer to the RAM location which stores the target address.

The use of a RAM to store the target address makes it possible to alter the subroutine that is executed for a virtual machine instruction very quickly, without constructing different hardware.

Preferably, the pre-processor 130 makes it possible to use subroutines of native instructions compiled from a high level language (HLL), like the language C, for executing more complex virtual machine instructions. Causing the processor core to execute a subroutine of native instructions compiled from a HLL language normally requires that the arguments of the subroutine are prepared in a specific way for the processor core. For example in a MIPS processor the first four arguments of the subroutine are expected to be present in registers r4–7. Similarly, results are normally delivered in a specific way. For example in a MIPS processor results are delivered in registers $r2, $r3. The return address for the subroutine is expected in a specific register, for example register $r31.

In the virtual machine model these arguments and results are in virtual storage locations, which the preprocessor maps to physical registers and memory locations. However these registers and storage location may differ from those used in the HLL subroutine calls.

Therefore, the pre-processor is preferably arranged so that in response to one or more virtual machine instructions the preprocessor first feeds native instructions to the processor core which cause the processor core to transfer information from storage elements that hold the content of positions of the stack of the virtual machine to storage elements where arguments are expected for calling subroutine compiled from the HLL. Subsequently, the preprocessor feeds an instruction to the processor core to transfer control to the subroutine and after return from that subroutine the pre-processor feeds native instructions to the processor core to transfer results of the subroutine from predefined storage elements to storage elements that hold the content of positions on the stack of the virtual machine. Preferably the pre-processor causes the processor core to fetch the address of the subroutine from a RAM location in response to at least one of the virtual machine instructions that are treated in this way.

Arguments of the HLL subroutine may be compile-time arguments and run-time arguments or a mix of both. Run time-arguments are computed during program execution. The run-time arguments are therefore not available when the program is compiled (i.e. at compile-time).

An example of a simple virtual machine instruction whose argument is available at compile-time is the Java bytecode 'bipush n', where 'n' is supplied by the compiler. An example of a virtual machine instruction that requires run-time arguments is the Java bytecode 'iadd' (of course in practice one would use HLL subroutines only for more complicated instructions). This instruction adds two integer arguments from the stack and places the result on the stack. A high level language (e.g. C) function for this virtual machine instruction could be defined as follows:

int iadd(int a0, int a1)
{return a0+a1;}

The programming conventions for the MIPS processor require subroutines compiled from the HLL to expect the first 4 arguments in registers $r4 to $r7, and to place results in registers $r2 and $r3, and then return to the address pointed to by register $r31. The HLL compiler might translate the HLL iadd function to the following sequence of MIPS instructions:

add $r2, $r4, $r5
jr $r31

These instructions provide for using the arguments, producing a result (add) and return from the HLL subroutine. Before transferring control to the HLL subroutine, the preprocessor has to manipulate run-time data, that is, arguments for the above function have to be moved from the program context into the argument registers, prior to calling function 'iadd'. For the Java virtual machine, this requires manipulating stack values, since the Java VM places computational values on a stack. In case a preprocessor generates processor instructions for such a call, it may generate the following sequence of MIPS instructions:

lw $r4,4($sp) // Get arguments from the virtual machine stack
lw $r5,8($sp)
addi $sp,$sp,8
jalr $r31,iadd // Call the HLL subroutine
nop // Fill branch-delay slot of the MIPS processor core.
sw $2,0($sp) // Place result back on stack. addi $sp,$sp,−4

In addition, the preprocessor may cause the processor core to save any information from storage elements that may be overwritten by the HLL subroutine. In particular, the part of the virtual machine stack that is stored in registers may be transferred to memory, preferably to the locations where the virtual machine stack is stored during normal execution of virtual machine instructions (i.e. without HLL subroutine execution).

HLL subroutines often also use a stack; normally it is guaranteed that HLL subroutines do not alter the contents of the stack "below" what is present on stack before the HLL subroutine is called. Therefore in principle one may use the same physical stack and stack pointer register for the virtual machine and for the HLL subroutine, if necessary after reserving a sufficient amount of stack space (by incrementing or decrementing the stack pointer as appropriate for a growing stack) before the HLL subroutine is called.

Another example of a Java bytecode which requires run-time arguments is the 'jsr n' (jump to subroutine at location 'current+n'). A HLL function for this virtual machine instruction could have the following call definition (e.g. in an include file):

void jsr( unsigned n, unsigned current);

A preprocessor generating a call to this function would feed the following sequence of MIPS instructions to the processor core:

ori $r4,$0,n
lui $r5,(current>>16)
ori $r5,$r5,(current&0xFF)
jalr $r31,jsr
nop

Of course the use of a mechanism for transferring argument information from locations representing storage in a virtual machine to storage elements where this argument information is expected by a HLL subroutine is not limited to preprocessors. One might implement this type of mechanism inside the processor core, or in a processor more generally, so that the processor in response to a special instruction transfers information to standard locations used by HLL subroutines and then transfers control to such a subroutine. Thus, in response to normal instructions the processor uses arguments from storage locations defined by a first argument storage convention, e.g. by taking arguments for each normal instruction from locations pointed at by a stack pointer, executing the function of the normal instruction, writing back the results at a conventional storage location and then executing the next instruction. In response to the special instruction, arguments are transferred and the next instruction to be executed is the entry point of the subroutine.

Figure 4:
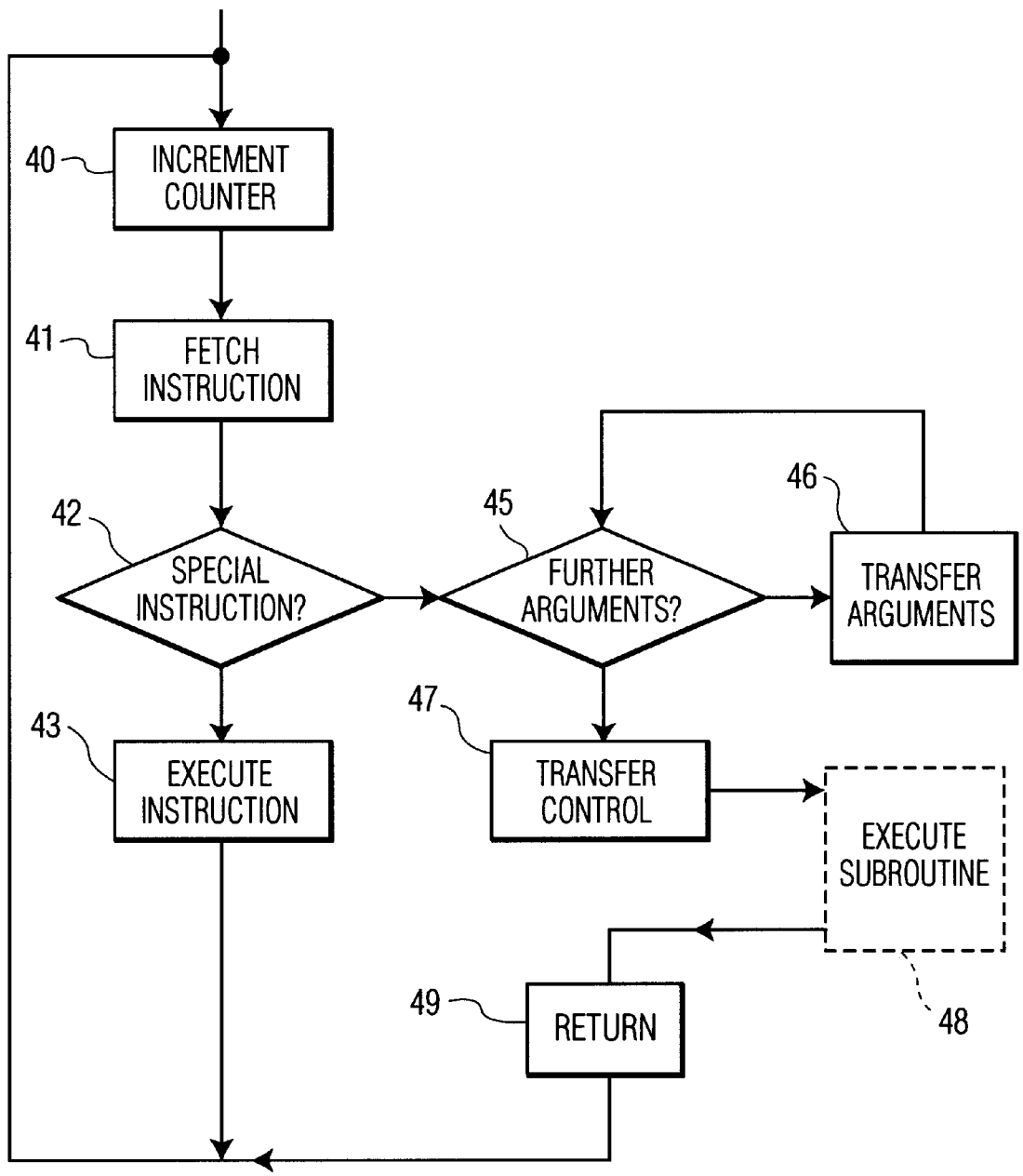
FIG. 4 shows a flow-chart for transfer of arguments.

FIG. 4 shows a flow-chart of processor operation which implements the transfer of arguments. At the left of this figure is a normal execution loop: in a first step 40, the program counter is incremented, in a second step 41 the instruction pointed at by the program counter is fetched, in a third step 42 it is tested whether this instruction is a special instruction, if not the instruction is executed in a fourth step 43 and the processor returns to the first step 40. The loop is shown as a sequence of steps, but of course steps from several iterations of the loop may be executing concurrently in a pipe-line. During execution of the instruction the processor reads the arguments of the instruction from locations as defined by the first argument storage convention.

If in the third step 42 the processor finds that the instruction is special, the processor executes a fifth step, to test whether there are any arguments. If so, the processor executes a sixth step 46, to transfer an argument from a storage location as defined in the first storage convention to its corresponding storage location in the second storage convention and returns to the fifth step 45 to see if there are any further arguments. If the processor determines in the fifth step 45 that there are no further arguments left, the processor transfers control to the subroutine in a seventh step 47. Thereupon the processor executes the subroutine (shown as a dashed step 48). If the flow-chart is executed by a pre-processor 130, the pre-processor 130 monitors the processor core 112 in this step until a return is detected.

Upon return from the subroutine the processor transfers the results of the subroutine (if any) from storage locations defined by the second argument convention to storage locations defined by the first argument storage convention in an eight step. After that the processor resumes with the first step 40 (of course the program counter may already be incremented when the subroutine is called, in which case the first step may be skipped over).

What is claimed is:

1. A data processing device comprising a memory;

a processor core having a native instruction set;

an interface between the memory and the processor core, arranged for passing native instructions which belong to the native instruction set from the memory to the processor core for execution, the interface including a preprocessor for reading virtual machine instructions from the memory, converting the virtual machine instructions into converted instructions belonging to the native instruction set and supplying the converted instructions to the processor core for consecutive execution, wherein the preprocessor is arranged for reading a further virtual machine instruction of a special type from the memory, retrieving a target address which has been predefined for said special type and for causing the processor core to execute a subroutine of the native instructions located in the memory at a location indicated by the target address in response to the further virtual machine instruction.

2. A data processing device according to claim 1, wherein the preprocessor monitors the processor core to detect completion of the subroutine and resumes supplying instructions to the processor upon detection of completion.

3. A data processing device according to claim 2, wherein the preprocessor monitors whether instruction addresses issued by the processor core are inside a predetermined range, for an instruction address range of the subroutine lying outside said predetermined range, the preprocessor detecting completion of the subroutine when the processor core issues an instruction address inside said predetermined range after transfer of control to the subroutine.

4. A data processing device according to claim 1, wherein the preprocessor in response to the further virtual instruction supplies preparatory native instructions to the processor core for creating a subroutine call context and subsequently issues a native instruction for causing transfer of control to said subroutine.

5. A data processing device according to claim 4, wherein the virtual machine instructions using arguments stored at storage locations defined by a first argument storage convention, the subroutine call context involving one or more arguments of the subroutine stored at storage locations predefined by a second argument storage convention, the first and second argument storage convention resulting in mutually different the storage locations, the preparatory native instructions including instructions for moving operands located according to the first argument storage convention to locations according to the second argument storage convention.

6. A data processing circuit for use in a processor device according to claim 1, comprising the processor core, the interface and a connection for the memory.

7. A data processing device comprising:

a processor, the processor having an instruction set containing first instructions, each first instruction causing the processor to execute a respective operation before executing a directly succeeding instruction from the instruction set, the respective operations each using one or more arguments stored at storage locations predefined by a first argument storing convention, wherein the instruction set also contains a special instruction which causes the processor to jump to a subroutine which uses one or more arguments stored at storage locations predefined by a second argument storing convention, the processor transferring the one or more arguments to the storage locations predefined by the second argument storing convention from storage locations predefined by the first argument storing collection in response to the special instruction, and wherein the processor reads an address of the subroutine from a predetermined location in response to the special instruction and transfers control to the address after transferring the one or more arguments.

\* \* \* \* \*